United States Patent Office 3,174,041
Patented Mar. 16, 1965

3,174,041
DEVICES FOR DETECTING BREAKS IN FUEL ELEMENT JACKETS IN A NUCLEAR REACTOR
Jean Graffieaux, Chatenay-Malabris, and André Roguin, Antony, France, assignors to Commissariat à l'Energie Atomique, Paris, France, an organization of France
Filed May 18, 1961, Ser. No. 112,491
Claims priority, application France, May 20, 1960, 827,834
11 Claims. (Cl. 250—83.6)

The present invention relates to a device for detecting breaks in the fuel jackets of a nuclear reactor and it is more especially but not exclusively concerned with the monitoring of an independent experimental loop which may contain fuel elements and through which a cooling gas flows in a closed circuit, said loop being for instance disposed in the vicinity of the core of a nuclear reactor where it is subjected to the action of an important neutron flux.

There are known devices for detecting leaks in nuclear reactors cooled by a gaseous substance (in particular of the type described in the Swiss Patent No. 351,349, filed May 17, 1956, by the Commissariat à l'Energie Atomique), wherein leaks of a jacket surrounding an element of fissionable material are detected and monitored by determining the variation, downstream of possible leaks, of the radioactivity of the gas flowing close to the jacket, means being provided for detecting the variations of radioactivity whatever be the importance of the normal radioactivity imparted to the cooling gas due to its passage through the reactor.

In particular, there are known devices of this kind (described in the Belgian Patent No. 579,818, filed June 18, 1959, by the Commissariat à l'Energie Atomique) in which the cooling gas (or the portion thereof used for detecting purposes) after having remained in a chamber for a time (some seconds) sufficient for the formation of radioactive ions from some gaseous fission products, passes between an ion repulsing fixed electrode and a rotary metallic drum which collects on an area of its periphery the radioactive ions for a given time, and then, rotating through a given angle, brings this area in close proximity to a counter which measures the radioactivity thereof, the same operations being repeated for the other areas of the drum and the periods and angles of rotation of the drum to collect the ions and to permit the measurement being such that the collection of ions takes place on a given area of the drum only after a time sufficiently long to enable the radioactivity of the collected ions to have considerably dropped. Furthermore, to reduce the error due to the residual radioactivity of every area, a measurement of this residual radioactivity may be effected before the area is used for the next collection of ions.

The chief object of the invention is to improve the devices above mentioned, in particular to adapt them to the monitoring of an independent experimental loop intended, among other things, to permit of studying the behaviour of fuel slug jackets under conditions similar to those in which said jackets are to be used in the reactor.

A device of this kind comprises a chamber, a rotating metallic drum, a positive ion repulsion electrode disposed opposite the periphery of said drum, a radioactivity detector disposed opposite the periphery of said drum at some distance from said electrode, a gastight casing surrounding said drum, said detector and said electrode, means for circulating a gaseous stream to be studied successively through said chamber and the space between said drum and said electrode, the peripheral portion of said drum being provided with a recessed area capable of imprisoning between itself and the inner wall of said casing, a given volume of the gaseous stream from said chamber to bring it into proximity to said detector, the periphery of said drum being divided into a plurality of areas, said areas, with the exception of said recessed area and of at least one special non-recessed area, being called normal areas, means for bringing all these normal areas, first opposite said detector, then opposite said repulsion electrode at a positive potential and finally again opposite said detector, and for periodically bringing said recessed area and said special non-recessed area opposite said detector and calculator means operatively connected with said detector for giving, in response to the measurements made by said detector for the respective areas of said drums, the concentration of the short-lived fission products in said gaseous steam, the concentration of the long-lived fission products in said gaseous stream and the total activity of said gaseous stream.

Other features of this invention will become apparent in the course of the following detailed description of some embodiments thereof with reference to the appended drawings given merely by way of example and in which.

The device according to the present invention permits of monitoring the radioactivity of a gaseous stream to detect the breaks of fuel jackets with which this stream has been in contact. It is particularly suitable for the monitoring of an independent experimental loop in which the jackets containing the fuel slugs are cooled by means of a gas. In particular, the device according to this invention is adapted to be used in connection with a loop of the kind of that described in the French patent application for "Experimental Loop for a Nuclear Reactor," filed May 20, 1960, by the Commissariat à l'Energie Atomique and which is diagrammatically illustrated by FIG. 1. Block 1 shows the experimental loop immersed in a swimming-pool reactor and a circuit 2 is provided for the gas collected from this loop to feed, in particular, a detection device according to the invention, the connection between immersed loop 1 and circuit 2 being obtained through suitable means 1a. It has been found advantageous, in order to limit the number of communications between the immersed loop and the emersed portion, to dispose, in series, in the same conduit system, the detection device 3 according to the invention (including chamber 17 for the formation of ions, drum 10 with its motor 23, and, opposite this drum, a radioactive detector, for instance of the scintillation type, and a repulsion electrode 11 disposed in a housing 11a, the fluid to be studied passing between the drum and the electrode), and the device 4 for regulating the pressure in the loop. This device 4 serves to admit or to discharge the cooling gas, consisting for instance of $CO_2$ in the embodiment that is being considered.

Figure 1:
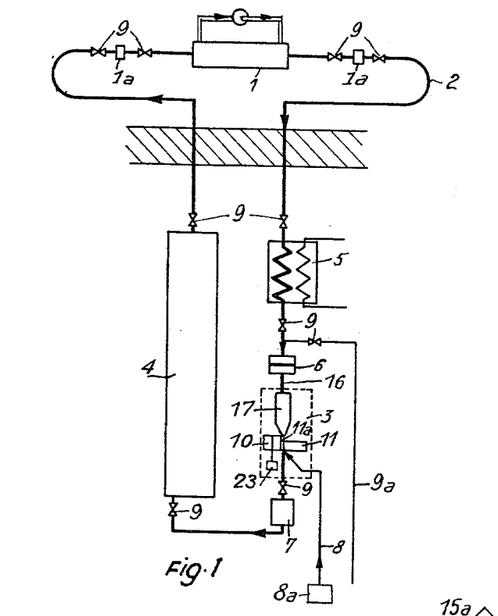
FIG. 1 shows a collecting circuit for a device according to the present invention.

As the collected gas is at relatively high temperature, there is provided a heat exchanger 5 intended to lower the temperature to a value suitable for the operation of the scintillator of the radioactivity detector which acts as detecting element proper and is disposed opposite drum 10.

A filter 6 is disposed upstream of detecting device 3 whereas a gas flowmeter 7 is disposed downstream of this device. This filter 6 is adapted to eliminate from the gas the dust that might be absorbed on the drum. It is advantageous to make use, for this purpose, of a filter such as described in the French Patent No. 1,169,127, filed March 6, 1957, by the Commissariat à l'Energie Atomique. A plurality of valves 9 are adapted to separate various sections of circuit 2 and the shunt connection 9a.

A conduit 8 permits of feeding with a sufficient flow-rate, from a source 8a, $CO_2$ to be used in the detection device 3 as it will be hereinafter explained.

The use of an independent experimental loop requires for detecting breaks in the fuel jackets, a device which must be wholly independent, sensitive and of an easy use. This device must in particular be capable of detecting any break or crack in a jacket, of giving information upon the importance of the diffusion of fission gases through the jacket, or jackets, of measuring the activation of the cooling gas and this device must also be capable of working at the different thermal power levels of the loop.

Due to the high specific activity of the cooling gas and to the requirements of the device, we make use of a detecting device including a drum of the kind described in the above mentioned Belgian Patent No. 579,818.

Figure 2:
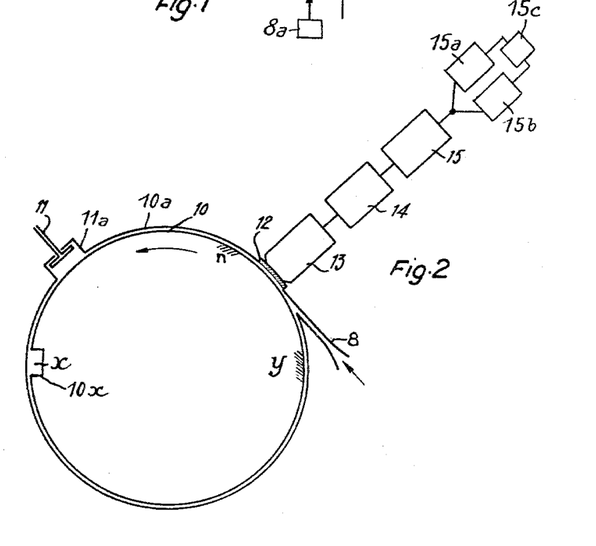
FIG. 2 is a cross section of a device made according to a first embodiment of the invention, this view showing the collecting drum, the repulsion electrode and the radioactivity detector.
Figure 3:
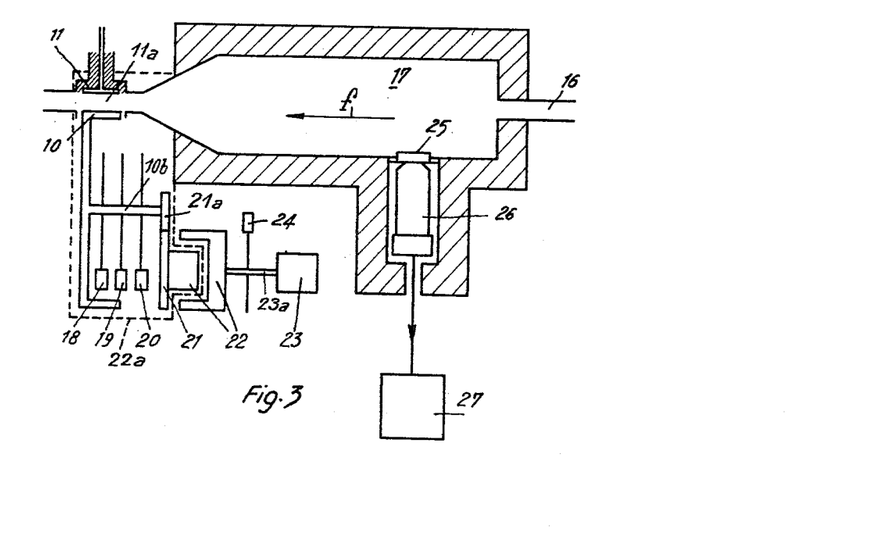
FIG. 3 is a longitudinal sectional view of the detecting device according to a first embodiment of the invention, this view showing the chamber where the ions are formed, the drum with its driving motor and the repulsion electrode.
Figure 4:
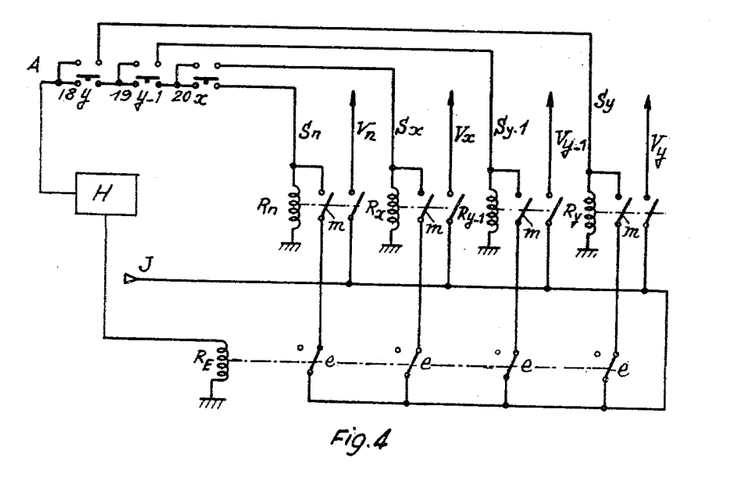
FIG. 4 shows the electric layout of the system for selecting the elementary programs of the device of FIGS. 2 and 3.

FIGS. 2, 3, 4 show, in a more detailed fashion, a first embodiment of a device of this kind made according to the invention. This device comprises a metallic drum 10 for the collection of radioactive ions, comprising, over its periphery, a plurality of radioactive measurement areas divided into the following groups:

Normal collecting areas $n$, the number of which is for instance eighteen;

an area, identical to the preceeding one but on which ions are never collected, hereinafter called area $y$; and an area, hereinafter called $x$, disposed in a recess or notch 10x of the drum and on which no ions are ever collected.

This last mentioned area permits of catching, between the envelope 10a of the drum and the drum 10 itself, a volume of gas so as to bring it into proximity of the detecting element.

On FIG. 2, the two areas $x$ and $y$ which never serve for the collection of ions are diametrically opposed but this arrangement is not necessary and in particular they might be adjacent to each other. An electrode 11 disposed opposite the surface of the drum, in a housing 11a provided in envelope 10a, constitutes the repulsion electrode. When it is at a high positive potential, it produces, on the area of the drum located opposite it, a collection of the radioactive positive ions passing through the space 11a between the electrode and the drum. On the contrary, when it is at a negative potential, electrode 11 absorbs or deflects the active ions contained in the gas passing in its vicinity, so that they are not absorbed by the drum.

The gas collected by the loop remains in a chamber 17 for the time (two or three seconds approximatively) necessary for the formation of radioactive positive ions (such as the radioactive rubidium, cesium, strontium and barium ions by means of which the detection is effected) resulting from beta decay of the gaseous fission products such as krypton and xenon. The gas having passed through chamber 17 subsequently arrives with a constant flow-rate under electrode 11 brought at a high positive potential (from 1 to 5 kv.) during the period of repulsion of the ions onto the drum.

The detector proper consists of a scintillator 12 and a photo-multipler 13 and its output signal consists of voltage pulses the number of which is proportional to that of the ions present on the area of the drum located opposite the detector and the amplitude of which is proportional to the energy of these ions. This signal passes through a preamplifier 14 before being sent to an electronic chain 15 of conventional type, for instance analogous to that described in detailed fashion with reference to FIG. 6.

During the measurements made on areas other than the recessed area $x$, a nozzle 8 permits, in the preferred embodiment, of engaging, under scintillator 12, $CO_2$ gas capable of strongly reducing the background noise due to the active gases (with respect to the scintillator) which may be present between drum 10 and scintillator 12. Precautions are taken so that the scintillator is not sensitive to the radiations emitted by chamber 17. Furthermore, the distance between electrode 11 and scintillator 12 is such that this last mentioned element is practically not influenced by the circulation of radioactive gases under electrode 11 through passage 11a.

Every measurement on a normal area $n$ is divided into three steps, as in the device described in the above mentioned Belgian Patent No. 579,818.

A first step corresponds to a radioactive measurement on a drum area which has not been used (that is to say on which ions have not been collected) for a time sufficient to enable the active ions collected during a prior cycle to have dropped to a low radioactivity. The measurement of this residual radioactivity is obtained by bringing this area in front of scintillator 12, the scintillations of which are counted in electronic chain 15, their number being stored up in a memory device 15a.

The second step corresponds to a collection of radioactive positive ions on area $n$ by bringing this area in front of electrode 11 which is given a high positive potential.

Finally, the third step, which immediately follows the second one, corresponds to the measurement of the radioactivity on area $n$ by placing once more this area $n$ in front of scintillator 12 and recording this second counting in a unit 15b.

On the contrary, for areas $x$ and $y$, there is merely performed, in a single step, the counting of radioactivity by bringing them opposite scintillator 12, the results of this counting being stored up in unit 15b. We will call $N_1$ the result of the first counting (taring) on a normal area $n$, $N_2$ the results of the second counting on the same area $n$ and $Nx$ and $Ny$ the results of the countings effected on areas $x$ and $y$ respectively.

Furthermore, in order to show how the results $N_1$, $N_2$, $Nx$ and $Ny$ of the countings are treated in order to extract therefrom the data useful for monitoring, we will call B the portion corresponding to the parasitic background noise due to the ambient radioactivity during a given counting, P the portion corresponding to the soiling or pollution of the drum by the long-lived fission products or collected ions, F the portion corresponding to the short-lived fission products or collected ions and $g$ the portion corresponding to the active gas, supposed to be undiluted, influencing the detector. On the other hand, $d$ is the dilution factor of this gas during measurements made with the injection of clean $CO_2$ through conduit 8. Finally, the active gas contained in recess 10x corresponding to area $x$ is supposed, during a counting relating to area $x$, to permit of determining, by counting, the portion G of the activity of the active gas itself, the counting of G taking place without injection of clean $CO_2$.

In these conditions, the following equations are obtained:

$$N_1 = B + dg + P$$
$$N_2 = B + dg + P + F$$
$$N_y = B + dg$$
$$N_x = B + g + G$$

The information obtained from monitoring the loop are:

The activity of the short-lived collected ions (constituting most of the collected ions) which is proportional to number F;

The relative proportion between the activity of the long-lived bodies and the activity of the short-lived bodies which is represented by the ratio $P/F$;

The specific activity of the collected gas which is proportional to number G.

The first of these informations (factor F) indicates the importance of a possible jacket break or crack, the second one (ratio $P/F$) permits of determining the importance of the gaseous diffusion through the jacket or through microscopic cracks. Finally, a third one (factor G) indicates the activity of the cooling gas.

The three desired informations are obtained by performing electroncially (in a conventional calculation unit 15c) on the numbers resulting from the above mentioned countings, the operations corresponding to the following linear equations:

$F = N_2 - N_1$ (subtraction of the contents of 15b and 15a)
$P = N_1 - N_y$ (subtraction of the contents of 15b and 15a)
$kG = N_x - N_y = G + g - dg$ With a sufficient distance between repulsion electrode 11 and scintillator 12 along the periphery of drum 10 and with a suitable shielding of chamber 17, number B may be very low, in particular as compared to G.

In these conditions, a good approximation for the third desired information may be constituted by number $Nx$ (stored in unit 15b) taken alone.

All of the above indicated measurements and operations take place during a cycle which comprises, on the one hand, the three above mentioned steps, to wit taring of the residual radioactivity ($N_1$), collection of the ions, and measurement of the total radioactivity ($N_2$) successively for all of the areas, and, on the other hand, the determination of the radioactivity of areas $x$ and $y$ (respectively $N_x$ and $N_y$).

When monitoring a single loop, the duration of an elementary cycle of the three above mentioned steps for an area $n$ is not critical because a very frequent measurement is not necessary. An information on every second or third minute is sufficient. Experience has taught that the sensitivity of a detector increases linearly with the duration of the ion collection up to values of 60 or 70 seconds and this maximum value has been chosen for a particular embodiment; the duration of the elementary cycle of measurement is then two minutes, the measurements of $N_1$ and $N_2$ corresponding to about 20 or 25 seconds.

When there is a direct passage of the fission products into the cooling fluid, for instance in the case of a crack in the jacket, only the time of circulation (some seconds) through collecting tube 2, filter 6 and chamber 17 separates the emission of the fission products through the crack from the arrival of the corresponding ions to the drum for measurement purposes. Experimental results and theoretical studies show that after 40 minutes of desoiling of the detector, the ratio $P/F$ ranges approximately from 5 to 10%.

On the contrary when there is a slow diffusion though the jacket, for instance in the case of microcrack, the interval of time between the emission of the fission products inside the jacket and the arrival of the corresponding ions to the collecting drum increases considerably and the short-lived radioactive elements are no longer active when they come opposite the detector. The proportion of the long-lived radioactive elements that are collected is therefore greater. When the duration of diffusion of the radioactive products between their emission and the collection of the corresponding ions increases, ratio $P/F$ also increases. It is multiplied by two for durations of diffusion averaging 200 seconds (it ranges from 10 to 20%) and is multiplied by four for durations averaging 1000 seconds.

In a particular construction, the surface of the drum carries 20 areas, to wit eighteen normal areas $n$, an area $x$ and an area $y$. The choice of this number results from a compromise between two conflicting conditions, to wit the obtainment of a sufficient desoiling of the drum between two successive utilizations of the same area $n$ in order to reduce number $N_1$ and therefore the importance of the statistic fluctuations and, on the other hand, the obtainment of a number P sufficient to have a significant value for the ratio $P/F$.

In view of the duration that has been chosen for the elementary cycle for an area $n$ (to wit two minutes) number P corresponds to a time of desoiling of thirty minutes (the collection lasting for one minute and taking place for a given area $n$ on every fortieth minute). This duration is a maximum and it might be reduced by slightly reducing the number of areas, for instance to a total value of 16 or 17.

The distance between electrode 11 and scintillator 12 along the periphery of the drum is advantageously chosen equal to $p$ times the width of an area, this number having no comon factor (i.e. being incommensurable) with the total number $s$ of areas. This permits of simplifying the means for controlling the rotation of the drum, all the rotations of the drum in one direction or the other being equal to $p$ times the width of an area $$\left( \text{that is to say } \frac{p}{s} \times 360 \text{ degrees} \right)$$

which permits of successively bringing into operative position all the $s$ areas during one cycle if $p$ and $s$ are incommensurable numbers: for instance, if $s$ is equal to 20, $p$ may be equal to 3.

Due to the particular operations which must be effected over the values of the measurements made by the detector, it is necesary to have an accurate marking of the position of the drum. In FIG. 3, which is a sectional view along the axis of drum 10, we have shown cams 18, 19, 20 which serve to determine the position of the drum. As shown by this figure, the collected gas is introduced through conduit 16 (downstream of filter 6) into chamber 17 where the radioactive positive ions are formed from the gaseous fission products. The volume of this chamber depends upon the rate of passage of the gas in the direction of the arrow $f_1$, that is to say upon the flow-rate of the collected gas. This volume is chosen in such manner that the gas remains in the chamber for two or three seconds approximately, which permits the formation of the ions by beta decay. When issuing from chamber 17, the gas passes between the surface of drum 10 and the repulsion electrode 11 through passage 11a before being recycled in the circuit of the loop as shown by FIG. 1. The shaft 10b of drum 10 carries three cams 18, 19, 20. These cams are angularly offset so as to operate microswitches when, at the beginning of an elementary measurement cycle, respectively, the area $x$, the area $y$, or the normal area just preceding area $y$, hereinafter called area $y-1$, is located under scintillator 12.

The rotation through an angle corresponding to three areas (distance between the repulsion electrode 11 and scintillator 12) is obtained by means of a speed reducing gear comprising two pinions 21–21a, the respective number of teeth of which are in the ratio 3/20, pinion 21a being secured to shaft 10b whereas pinion 21 is driven by means of a magnetic coupling 22, itself driven by an electric motor 23. The drive by means of a magnetic coupling 22 through a fluid tight casing 22a may be obtained as described in the Belgian Patent No. 590,903, filed May 13, 1960, as patent of improvement of the parent Belgian Patent No. 579,818, already mentioned.

The ratio of speed reducing gear 21—21a is chosen equal to 3/20 so that, for a revolution of the shaft 23a of motor 23, drum 10 rotates through an angle corresponding to three areas. Cam 24, carried or actuated by shaft 23a serves to stop the motor when an area (n, x or y) is located exactly in front of scintillator 12 (to a complete rotation of shaft 23a there corresponds a displacement of the periphery of drum 10 equal to the width of three areas) and to start the operations of an elementary cycle. Control of motor 23 takes place according to a program which is chosen in accordance with the initial position of the drum.

By way of indication, FIGURE 4 shows an electric layout which may be used for the selection, by means of program pulses sent by clock H through line A, of the channels V$n$, V$x$, V$y$–1 and V$y$ corresponding respectively to the programs of the normal areas, of area $x$, of area $y$–1 and of area $y$. For this purpose, we provide four lines S$n$, S$x$, S$y$–1, S$y$ and on every line is disposed the winding of a relay R$n$, R$x$ R$y$–1, R$y$ connected in the same manner. Thus to channel V$n$, V$x$, V$y$–1, V$y$ there is associated a relay R$n$, R$x$, R$y$–1, R$y$ respectively which, when it is energized causes current to be supplied to the corresponding channel V$n$, V$x$, V$y$–1, V$y$ from feed line J and therefore causes the corresponding program to be brought into play, a supplementary contact $m$ permits the maintaining of relay R$n$, R$x$, R$y$–1, R$y$ from line J. Relay R$n$ is fed through double contacts $y$, $y$–1 and $x$ controlled by cams 18, 19, 20 respectively. When these contacts are in their lower position (that is to say when cams 18, 19, 20 are not located opposite them) the program selected by channel V$x$ is that which corresponds to the program of a normal area (first measurement N$_1$, which is stored in a memory device, displacement through three areas of the drum, collection of ions, displacement through three areas of the drum in the opposed direction, second measurement N$_2$ which is compared with the first one, so as to deduce therefrom the difference under $N_2-N_1$). Relay R$x$ is supplied through contacts $y$ and $y$–1 in lower position and $x$ in upper position (that is to say when drum 10 is in the position for which area $x$ is located opposite scintillator 12). The program selected by channel V$x$ is a program comprising merely a measurement of radioactivity N$x$. Relay R$y$–1 is fed with current through contacts $x$ and $y$ in lower position and $y$–1 in upper position (that is to say when the drum is so located that its area $y$–1 is located opposite the detector): the program selected by channel V$y$–1 is the same as the V$n$ program for the operations of displacement of the drum and of measurement; however, the value N$_1$ for the area $y$–1 is intended to serve in the next elementary cycle for area $y$ to determine $P=N_1-N_y$ and it is therefore stored in a memory device. Thus quantity N$_1$ is kept in a memory device for the minimum of time. Finally, relay R$y$ is fed with current when contacts $x$ and $y$–1 are in lower position and contact $y$ is in upper position (that is to say when the drum has its area $y$ located opposite detector 12). The program selected by channel V$y$ consists in the measurement of the radioactivity of area $y$, that is to say of N$_y$.

A relay R$_E$, also fed with pulses coming from clock H, when opening contacts $e$, cuts off the supply of current through the contacts $m$ of relays R$n$, R$x$, R$y$–1, R$y$ from line J. Therefore, when current is fed to relay R$_E$, relays R$n$, R$x$, R$y$–1, R$y$ are returned to the state of rest. At the beginning of every elementary cycle a pulse fed to relay R$_E$ cancels the program precedingly selected, then the pulse sent through line A controls the new program, which is stored up in a memory device through relays R$n$, R$x$, R$y$–1, R$y$.

It is also necessary to provide means for producing a signal $a$ for correction of the measurements in accordance with the value of the mean flux of neutrons in the experimental loop. In the first embodiment shown by the drawings, we have provided (FIG. 3) a second detector of particles particularly sensitive to neutrons, disposed in the chamber where ions are formed. This detector comprises a scintillator 25 cooperating with a photo-multiplier 26 the output signal of which is fed to an electronic chain 27. Owing to this system 25, 26, 27 the activity of nitrogen N$_{16}$ contained in the collected gases is measured. It is possible to deduce from this measurement the coefficient $a$ which permits of taking into account, in the determinations of the activity of the fission products, the variations of power of the loop, for instance according to the indications supplied by the Belgian Patent No. 572,142, filed October 17, 1958, by the Commissariat à l'Energie Atomique.

Another solution may also be considered, which consists in measuring the activity of the nitrogen N$_{16}$ contained in the recess area $x$ by making use of a relatively high discrimination threshold and in storing up in a memory device the signal that is obtained during the rotation of the drum. We thus obtain a single reference measurement once on every fortieth minute. We thus eliminate the necessity of measuring the total activity of the gas by means of area $x$, another recessed area being possibly provided for this purpose. An advantage of this last mentioned solution is to have all the measurements obtained by means of a single scintillator 12, and of a single counting chain 15.

By way of indication, it should be noted that, in the second solution the measurement relative to coefficient $a$ is made over a complete cycle but only the final value is retained. In both cases, the correction corresponding to coefficient $a$ may be obtained by means of a potentiometer fed with direct current and the sliding element of which is positioned by means of a servomotor. The voltage proportional to $a$ that is thus obtained serves to feed the potentiometers in which are stored up the number corresponding to F. Signal F is extracted by subtraction by means of a system of capacitors and relays.

Figure 6:
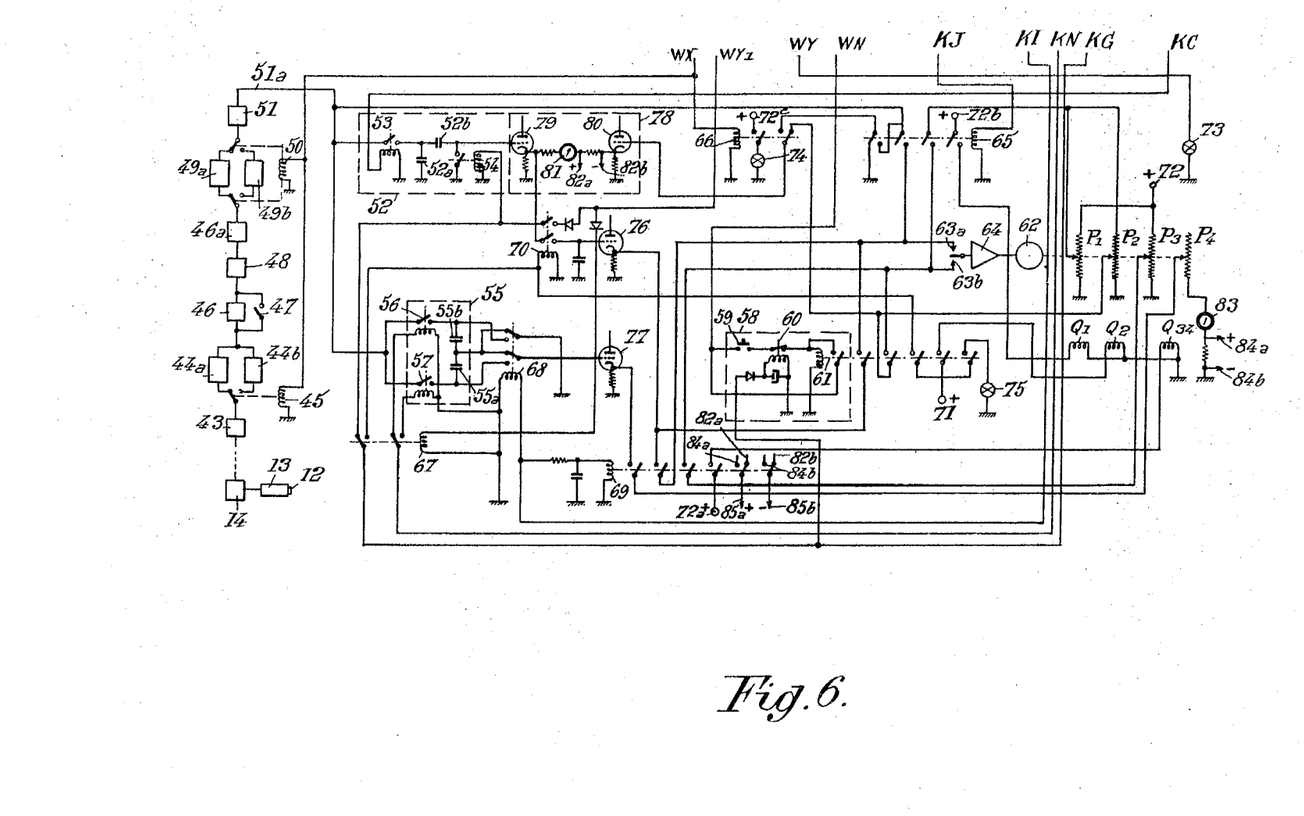
FIG. 6 shows the electric system for performing the elementary programs.
Figure 7:
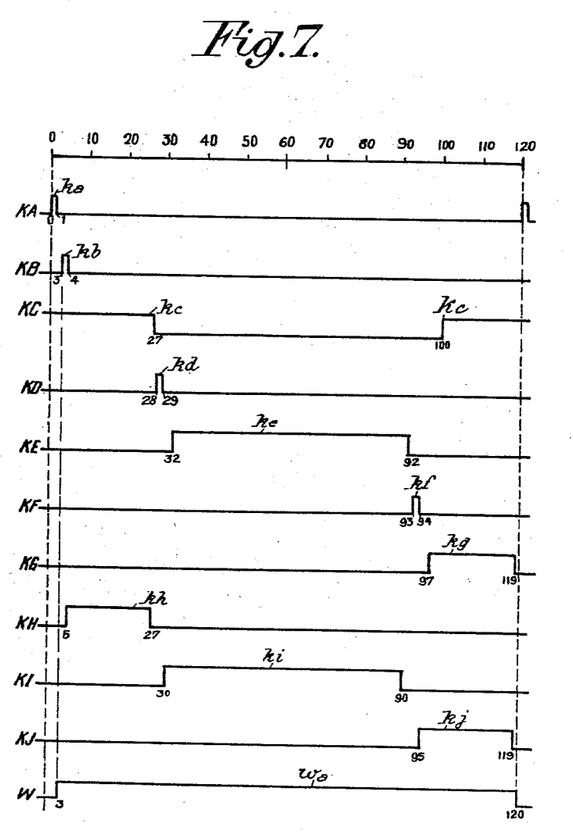
FIG. 7 is a diagram showing the time distribution of the successive operations of the elementary programs.

Such a construction making use of a single detector will now be described with reference to FIGS. 5, 6, 7, it being well understood that the details of the electric circuit of FIGS. 5 and 6 and the schedule of FIG. 7 are also applicable to the embodiment of FIGS. 1 to 4, with the exception of the means for the determining coefficient $a$.

Figure 5:
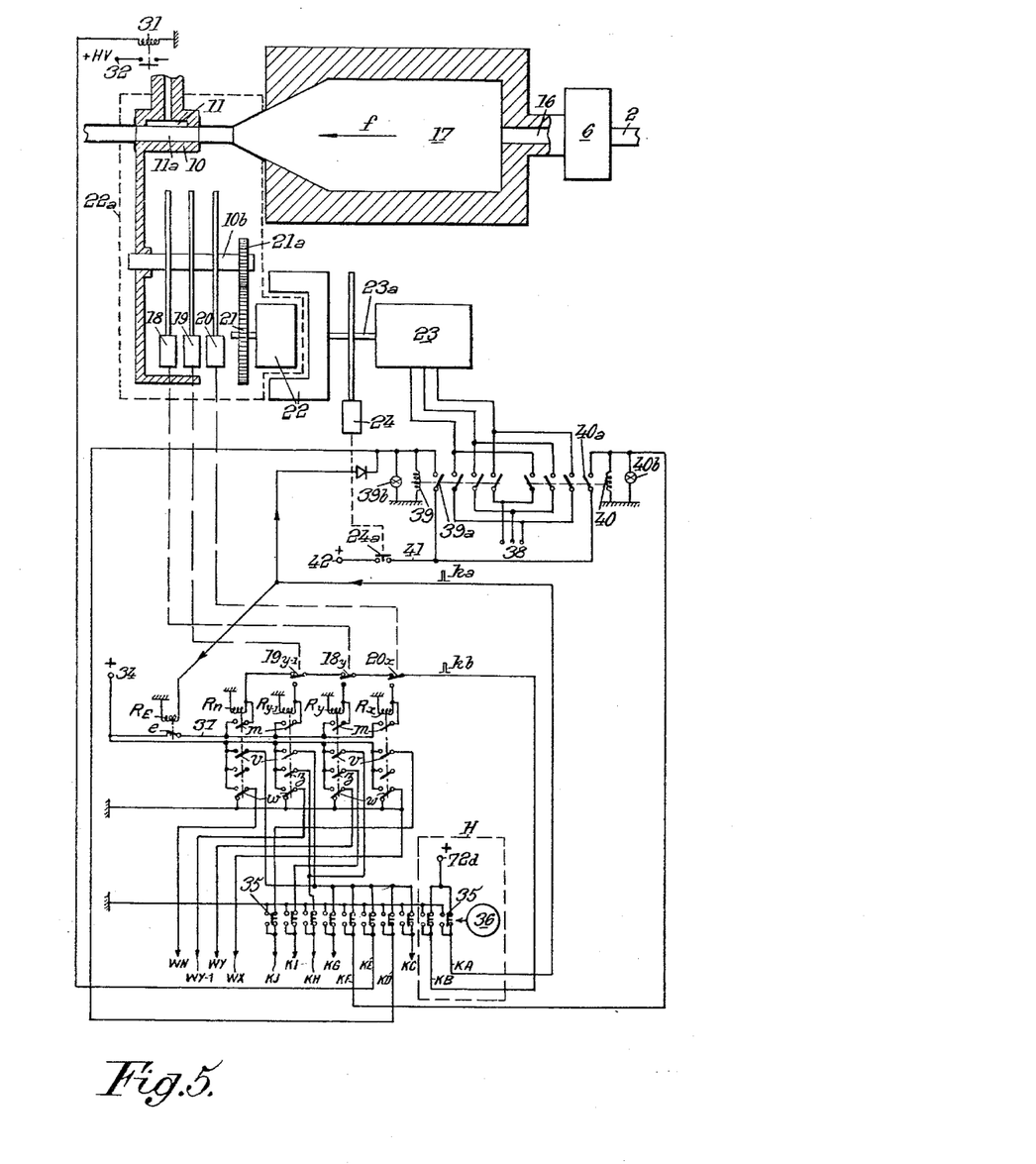
FIG. 5 is a transverse sectional view of the detecting device according to a second embodiment of the invention, together with the circuits associated with this device for controlling the driving motor and selecting the elementary programs.

In the construction of FIGS. 5 and 6 (FIG. 5 showing the elements for controlling the rotation and selecting the elementary programs, whereas FIG. 6 shows the analog calculation and storing circuits associated with the scintillation counter), we use the same reference numbers and characters as in the construction of FIGS. 1 to 4 to designate the equivalent elements.

The detection device according to the construction of FIGS. 5 and 6 comprises:

A conduit 2 for the inflow of the gaseous stream to be studied (from the point of view of radioactivity and percentage therein of fission products in order to detect a break or a crack in a jacket surrounding a fuel element) coming either from an experimental loop or from a channel of a heterogeneous nuclear reactor cooled by means of a gas as in the patents above mentioned, A filter 6 intended to stop dust and aerosols in suspension in this gaseous stream, this filter being for instance of the type described in the French Patent No. 1,169,127, filed March 6, 1957, by the Commissariat à l'Energie Atomique, A chamber 17 through which the filtered gaseous stream flows in 2–3 seconds in the direction of the arrow $f$, some gaseous fission products (krypton, xenon) being transformed in this chamber into active positive ions (rubidiums, cesiums, etc.), A passage 11a between an electrode 11 which may be brought, when relay 21 is energized, to the potential +HV (of for instance 5000 volts) of a source 32 of direct high voltage current and an area $n$, $x$, $y$, or $y-1$ of the periphery of the metallic drum 10 adapted to rotate together with its shaft $10a$, Means for driving this drum in one direction or the other through an angle of $$\frac{p}{s} \times 360°$$

($s$ being the number of areas and $p$ the distance measured in number of area widths along the periphery of the drum between electrode 11 and scintillator 12, $s$ being incommensurable with $p$), for instance of $$\frac{3}{20} \times 360° = 54°$$

(if $p=3$, $s=20$), these means comprise a reversible three-phase motor 23, the shaft $23a$ of which carries a cam 24 which for a given angular position of the rotor of motor 23 opens a contact $24a$ and cuts off the current supply of the motor, which therefore always stops with its rotor in a well determined position (the means for breaking and blocking in this position having not been shown), A magnetic coupling 22 for transmission through a gas-tight casing $22a$ in which are housed: drum 10 with its shaft $10b$, passage $11a$, electrode 11, scintillator 12, photomultiplier 13, preamplifier 14 and the elements 18, 19, 20, 21, $21a$, which will be more completely described hereinafter, this transmission being advantageously of the type described in the above mentioned Belgian Patent No. 590,803 and a speed reducing gear $21-21a$ of a ratio equal to $3/20$ so that shaft $10b$ turns through $3/20$ of a revolution (that is to say $54°$) for every revolution of the shaft $23a$ of motor 23, Cams 18, 19, 20 carried by shaft $10b$ and which, when the drum is stopped with area $y$ (on which there is never any ion collection), area $y-1$ (preceding area $y$ in the direction of successive examination of the areas), or recessed area $x$ (on which there is never any collection) located opposite scintillation detector 12, 13, displace contacts $18y$, $19y-1$, $20x$ from the position illustrated by the drawing, where they are in series in line KB through which pulses $kb$ are fed to the winding of relay R$n$, toward the position where they respectively ensure the feed of these pulses to the windings of relays R$y$, R$y-1$ and R$x$, A matrix of contacts for selecting the elementary programs comprising: four maintaining relays $m$ (serving to keep in position each of the relays R$n$, R$y$, R$y-1$, R$x$ and supplied with current from a source 34); four contacts $w$ supplying current (from said source 34), when they are closed, respectively to lines WN, WY, WY–1, WX which are visible on FIG. 6; four contacts $v$ feeding current (also from source 34) to conductors KG, KF, KE, KD, KC for relays R$n$ and R$y-1$, KH for relay R$y$ and KJ for relay R$x$, and this through contacts 35 periodically actuated during determined durations (hereinafter indicated with reference to FIG. 7), for instance by cams carried by a shaft 36 making one half-revolution per minute (so that it makes one revolution during one elementary cycle), two contacts $z$, the contact $z$ of R$y-1$ feeding current to KH whereas the contact $z$ of R$y$ feeds current to KI (these two current supplies taking place through contacts 35 operated by the cams of shaft 36), A relay winding $R_E$ with its contact $e$ disposed in the line 37 for maintaining the supply of current to relays R, the energizing of $R_E$ having for its effect to cut off the maintaining or holding current to these relays, A three-phase supply 38 for motor 23, a relay 39 ensuring the supply of the motor for rotation in the direct direction with the holding contact $39a$ and its signal lamp $39b$, a relay 40 ensuring the supply of the motor for rotation in the opposite direction with its holding contact $40a$ and its signal lamp $40b$, A conductor KA which, when its contact 35 is closed by shaft 36, feeds pulses $ka$ on the one hand to relay $R_E$ and on the other hand to relay 39, whereas conductor KF, when its contact 35 is closed, supplies current to relay 40, A self-supply line 41 connected to a source 42 for maintaining relays 39 and 40 through their holding contacts $39a$, $40a$, this line 41 comprising contact $24a$ opened by cam 24 when the rotor of motor 23 occupies its predetermined position, A scintillation detector, with the electronic system associated therewith (as shown by FIG. 6), this detector comprising on the one hand a scintillator 12, a photomultiplier 13 and a preamplifier 14 housed in casing $22a$, and on the other hand, on the outside of this casing, an amplifier 43, two amplitude selectors $44a$, $44b$ having distinct thresholds and which can be alternately switched on by means of a relay 45 supplied through conductor WX, a frequency divider for division by 10 (constituted by a decade 46) which may be short-circuited by manual operation of contact 47, thus supplying two different ranges permitting the measurement of very different activity levels, a wave shaping stage 48 (comprising for instance a monovibrator for calibrating the pulses) a second frequency divider $46a$, two integrators $49a$, $49b$ of different sensitivities and which can be switched on alternately at the same time as selectors $44a$, $44b$ by means of a relay 50 fed in parallel with relay 45 through conductor WX, the analog output of the detector, amplified in amplifier 51 and available on conductor $51a$, consisting of a voltage substantially proportional to the amount of particles of an energy higher than a given threshold (different for $44a$ and $44b$) having reached scintillator 12, A first analog storing unit 52 for the obtainment of the activity of the short-lived ions, including two capacitors $52a$, $52b$ and two relays 53, 54, A second analog storing unit 55 for determining the ratio P/F of the activity of the long-lived ions to that of the short-lived ions, this unit comprising two capacitors $55a$, $55b$ and two relays 56, 57, A taring unit 58 for determining the value of F, which is equal to $N_2 - N_1$, with possibility of storing the value F, possibly multiplied by coefficient $a$, this unit comprising a push-button 59 which permits this storing and two relays 60 (supplied through KG) and 61 (supplied by the operation of the push-button if relay 60 is supplied with current), A system of potentiometers $P_1$, $P_2$, $P_3$, $P_4$ the sliding elements of which are movable by means of a servomotor 62 which may be coupled by means of an electromagnetic clutch (not shown), operated by winding $Q_1$ for coupling with the sliding element of $P_1$, by winding $Q_2$ for coupling with the sliding element of $P_2$ and by winding $Q_4$ for coupling with the sliding elements of $P_3$ and $P_4$, the servomotor having a tendency to displace the sliding element that is coupled in a direction such that the difference of potential between points $63a$ and $63b$, which supplies motor 62 through a high gain operational amplifier 64, is zero, Relays 65 fed through KJ, 66 fed through WX, 67 fed through WY–1, 68 and 69 fed through KI and 70 supplied through KG when relay 67 is energized or by a source 71 when relay 61 is energized, A source of current 72 for the terminal of potentiometers $P_1$ and $P_3$ which is not earthed and current sources $72a$, $72b$, $72c$, Signal lamps 73, 74, 75, Triodes 76, 77 mounted in cathode-follower fashion, A comparator stage 78 including two triodes 79, 80, the difference of potential between the cathode of these triodes being indicated by a voltmeter or ammeter 81 or available on conductors $82a$, $82b$, Another voltmeter or ammeter 83 disposed in the circuit of potentiometer $P_4$ to indicate the position of its sliding element, reading of the position of the sliding element of P₄ being also possible through conductors 84a, 84b, Finally a recording device (not shown), branched through terminals 85a, 85b, either to conductors 84a, 84b or to conductors 82a, 82b accordingly as relay 69 is energized or not (see FIG. 6).

The operation of the device of FIGS. 5 and 6 is as follows, the pulses and currents will bring into play the different programs being shown on FIG. 7 for the respective conductors K and W (the abscissas corresponding to the times in seconds being plotted on the upper horizontal line).

At the beginning of an elementary cycle a cam of the shaft 36 of clock H closes the contact 35 of line KA, which sends a pulse $ka$ from source 72d. This pulse, the duration of which is one second, is sent to $R_E$, which opens contact $e$ and cancels the preceding elementary program, which had been inscribed, by energizing one of the relays R (according to the area to which the preceding elementary cycle corresponded); furthermore, pulse $ka$ is transmitted to relay 39, which causes motor 33 to rotate in the direct direction; cam 24 permits contact 24a to drop and relay 39 is maintained by 24a and 39a until shaft 23a has finished a complete revolution; at this time cam 24 opens contact 24a, which cuts off the supply to 39 and therefore to motor 23. During the whole of the rotation of the motor in the direct direction, lamp 39b is on. Drum 10 has turned through 3/20 of a revolution and a new area is in position in front of scintillator 12. The duration of this rotation is for instance 2.5 seconds and it is finished before the contact 35 of KB is closed, that is to say before the appearance of pulse $kb$, the duration of which is for instance one second, between the third and fourth seconds from the beginning of the elementary cycle. Pulse $kb$ is directed toward one of the relays 4 which select the program, to wit:

Toward R$n$ if a normal area is located opposite scintillator 12, that is to say if contacts 18y, 19y–1, and 20x are not actuated by their respective cams 18, 19, 20;

Toward R$y$–1 if area $y$–1, which is the normal area preceding area $y$, in the order of utilization of the areas, is located opposite scintillator 12, that is to say if contact 19y–1 is actuated by cam 19;

Toward R$x$ if area $y$ is located opposite scintillator 12, that is to say if contact 18y is actuated by cam 18;

Toward R$y$ if the recessed area $x$ is located opposite scintillator 12, that is to say if contact 20x is actuated by cam 20.

It is to be understood that the relative positions of the areas of detector 12–13 and of electrode 11 are those shown by FIG. 2, drum 10 and the parts cooperating therewith being identical in both constructions.

The program pulse $kb$ has a duration of only one second, but it permits the inscription of the elementary program in one of the relays R owing to the maintaining contact $m$ of the relay R that is energized, R being kept energized from 34 during the whole of the elementary program, contact $e$ being opened by the energizing of $R_E$ by pulse $ka$ only after the end of the program in operation and at the beginning of the next elementary program.

Relays R supply current:

Through their contacts $v$ and $z$ to some of the conductors K during a time determined by the closing of the corresponding contacts 35 by means of cams carried by shaft 36, the durations of these closing periods and the times at which they occur being illustrated on FIG. 7 for every line K;

Through their contact $w$ to the respective conductors W for the whole of the time for which relay R is energized, that is to say from the beginning of pulse $kb$ to the beginning of the next pulse $ka$ (on FIG. 7 we have shown on the last line the voltage step wave W$a$ available on one of the lines W, selected by the relay R that is energized).

A study of the bottom part of FIG. 5 shows that:

For a normal area, the contact $v$ of R$n$ supplies current to KC, KD, KE, KF, KG, through the step waves $kc$, $kd$, $ke$, $kf$ and $kg$ of FIG. 7, and the contact W of R$n$ supplies current to WN through step wave W$a$ (FIG. 7);

For area $y$–1, the contact $v$ of R$y$–1 supplies current to the same lines and in the same manner as the contact $v$ of R$n$ (because it is a particular normal area), the contact $z$ of R$n$–1 supplies current to KH through step wave $kh$ and the contact $w$ supplies current to WY–1 through a step wave W$a$;

For the area $y$, the contact $v$ of R$y$ supplies current to KH through step wave $kh$, the contact $z$ of R$y$ supplies current to KI through step wave $ki$, and the contact $w$ of R$y$ supplies current to WY through a step wave W$a$;

For area $x$, the contact $v$ of R$x$ supplies current to KJ through step wave $kj$, whereas the contact $w$ of R$x$ supplies current to WX through step wave W$a$.

In the case of a normal area, the elementary program comprises, as above indicated, two displacements of the area of the drum, to wit a first displacement in the direct direction to bring it opposite electrode 11 and a second displacement in the opposed direction to return this area opposite detector 12–13. These two displacements are of an amplitude equal to 3/20 of a revolution and they are controlled by pulses $kd$ for the direct direction and $kf$ for the opposed direction. These pulses are fed respectively through conductors KD and KF to relays 39, 40, which owing to their maintaining contacts 39a, 40a, supply current to motor 23 for a rotation of one revolution thereof in the direct direction and in the opposed direction respectively. At the end of one complete revolution during which lamp 39b or 40b has been switched on, cam 24 cuts at 24a the supply of maintaining current to 39 or 40. Owing to the speed reducing gear 21–21a, the drum thus rotates through an angle of +3/20 of a revolution in response to pulse $kd$ and through −3/20 of a revolution in response to pulse $kf$.

Pulses $kd$ and $kf$ divide the program for a normal area into three periods, to wit:

A taring period for measurement of the residual radioactivity $N_1$ of area $n$ (before pulse $kd$), area $n$ being located opposite detector 12–13, An ion collecting period for the area located opposite electrode 11 which is brought to the high potential 32 due to the supply of current to relay 31 through step wave $ke$ arriving through line KE, this period being comprised between pulse$s$ $kd$, $kf$ (step wave $ke$ is comprised between these two pulses), and A period for the measurement of the radioactivity $N_2$ of area $n$ with the ions thereon, during which this area is again located opposite detector 12–13, this period beginning after $kf$ and thus permitting of calculating $N_2−N_1$ which represents the activity of the collected ions (this operation being controlled by step wave $kg$). Electrode 11 may be brought (through suitable means not shown) to a negative potential so as to attract positive ions during the taring and measurement periods.

During the programs for areas $y$ and $x$, this area remains permanently opposite detector 12–13, the active period being at the middle of the elementary cycle (step wave $ki$) for area $y$, this period, the position of which is not critical, being sufficiently long to permit a sufficient accuracy despite the low radioactivity (the area in question being one on which ions are never collected) and at the end of the elementary cycle (step wave $kj$) for area $x$ to obtain a good stabilization in the circulation of the gas after the end of the injection of $CO_2$ which has taken place for the preceding area.

On FIG. 7 we have plotted the times (in seconds from the beginning of pulse $ka$ and therefore of the elementary cycle) of the beginning and of the end of every pulse or step wave.

Referring more particularly to FIG. 6 we will explain how the different voltages supplied by the electronic chain of detector 12–13 are treated in order to obtain the values to be determined.

Measurement of factor $a$ (for the correction of the measurements) as a function of the neutron flux which factor in the first described embodiment was determined by detector 25–26, is obtained by means of recessed area $x$, this measurement being made on the gas imprisoned in this recess.

The signal or step wave $Wa$ which arrives through line WX supplies current to switching relays 45, 50, which choose the discriminator or amplitude selector 44b the upper threshold of which corresponds to the passage of pulses corresponding to the beta radioactivity of nitrogen 16 which serve to the determination of factor $a$ and integrator 49b which gives a suitable output signal for this determination. The output signal available at 51a is utilized only for the duration of step wave $kj$ arriving through line KJ to energized relay 65. The energizing of this relay (at the same time as that of relay 66 supplied through WX simultaneously with relays 45, 50) has the following effect when considering the contacts of 65 successively from the right toward the left:

It causes current to be supplied by source 72 to winding $Q_1$ so as to couple with the servomotor the sliding element of potentiometer $P_1$, and to connect this sliding element with contact 63b, It causes the output 51a of the counting electronic channel to be connected to contact 63a, thereby ensuring the displacement of the sliding element of $P_1$ until it supplies a voltage equal to the voltage available at 51a, the position of the sliding element of $P_1$ indicating the value of factor $a$.

It causes the output 51a to be connected with the grid of the triode 80 of comparator 78, the output voltage at 51a being negative in line 82b and consequently at the terminal 85b of the recorder, relay 69 being in the state of rest.

We thus obtain an inscription of $a$ on the recorder and a memorizing of $a$ on potentiometer $P_1$.

For the other determinations, relays 45 and 50 are not energized and the elements that are branched are discriminator 44a and integrator 49a.

For a normal area the output voltage of the electronic chain, available at 51a, is applied during the first period (taring) and the third period (measurement of the collected ions) of the cycle to the left input terminal of unit 52 because relay 53 is fed with current during these two periods through step wave $kc$ arriving through KC. On the contrary, the relay 54 of unit 52 is fed with current only during the third period by step wave $kg$ arriving through conductor KG. Unit 52 thus effects the difference between $N_2$ measured during the third period and $N_1$ measured during the first period. The difference $F=N_2-N_1$ thus represents the activity of the short-lived ions that are collected and is therefore available on the cathode output of triode 79 and then on conductor 82a. It is therefore recorded on the recorder, the terminal 85a of which is then connected to line 82a.

In order to follow the evolution of F, it suffices to compare the successive values of F to the value $F_0$ of F at an initial time. It is thus possible to determine $E_1=F-F_0$ or better $E=F-aF_0$ when taking factor $a$ into account. For this purpose, it suffices, at a given time taken as origin to follow the evolution, to depress push button 59 during the end of an elementary cycle for a normal area $n$. If this button were depressed during a cycle corresponding to an area $x$, $y$, or $y-1$, this operation would have no effect because relay 60, the contact of which is in series with that of push-button 59, is supplied with current only during the third period of a cycle corresponding to an area $n$, through step wave $kg$. The closing of the contact of push-button 59, with that of relay 60 (supplied through $kg$), energizes by means of step wave $Wa$ arriving through line WN, the relay 61 of the taring unit 58. The following results are obtained, considering the contacts of relay 61 from the right toward the left:

Switching on of lamp 75, which indicates that $aF_0$ is memorized,

Supply of current to winding $Q_2$ which connects to the servomotor the sliding element of potentiometer $P_2$ one terminal of which is fed with $a$ from the sliding element of potentiometer $P_1$, Relay 70 is energized, which connects together triodes 79 and 76 mounted in cathode-follower fashion, The sliding element of potentiometer $P_2$ is connected through contact 63b, The output of unit 52 (which delivers $F=N_2-N_1$) is connected through the two cathode-follower stages 79 and 76 to contact 63a, the voltage of the sliding element of $P_2$ and F being compared with each other and caused to be equal by means of amplifier 64 and of servomotor 62 which displaces the sliding element of $P_2$. The value of $aF_0$ is thus memorized in $P_2$ supplied with $a$.

As relay 66 is not fed with current during one cycle for a normal area $aF_0$ is also applied to the grid of the triode 80 of comparator 78, the triode 79 of which receives on its grid $F=N_2-N_1$. Comparator 78 thus determines $E=F-aF_0$ which can be read on the dial of 81. Furthermore $aF_0$ can be recorded through line 82b and terminal 85b in the recorder.

Finally, determination of the ratio $P/F$ of the respective activities of the long-lived ions and of the short-lived ions is performed from the measurements of activity on area $y$ and on area $y-1$.

For area $y-1$, the means for controlling the displacement of the drum are the same as for area $n$ (the contacts $v$ of relays R$n$ and R$y-1$ supply current to the same conductors K through the same contact 35). The values of $N_1$ and $N_2$ for area $y-1$ are stored up in the same manner as the values $N_1$ and $N_2$ for an area $n$, by means of the capacitors 52a, 52b of unit 52. As a matter of fact, during the first period (taring period), relay 53 is supplied with current by means of step wave $kc$ arriving through KC as for an area $n$, whereas, during the third period, relay 53 is supplied with current, by means of step wave $kc$ as for an area $n$, and relay 54 by means of a step wave $Wa$ arriving through WY-1 through the upper contact of relay 70 fed by means of $kg$ through the left hand contact (in working position on the right) of relay 67 supplied, in parallel with 54, by step wave $Wa$.

Furthermore, during this first period, relay 57 is supplied with $kh$ through the right hand contact in working position of relay 67, which stores up $N_1$ in capacitor 55a.

During the next cycle, which is concerned with area $y$, the right hand contact of relay 67 returns to its position of rest and $kh$ (supplied for area $y$ as for area $y-1$) is fed to relay 56. Therefore, capacitor 55b stores up $N_y$. Unit 55 determines the difference $P=N_1-N_y$ ($N_1$ being considered for area $y-1$ which precedes $y$). Relay 68 is supplied with $ki$ (through conductor KI) after the end of $kh$ and permits the passage of P to triode 77. As relay 69 is also fed with $ki$, P, available on the cathode of 77, is applied to the sliding element of $P_4$ which is coupled with a servomotor at the same time as the sliding element $P_3$, due to the fact that current is supplied to winding $Q_{34}$ through voltage source 72a through a closed contact of relay 69. The energizing of this relay has also for its effect to connect with points 63a and 63b respectively the output of triodes 79, 76 (connected due to the fact that that step wave $kg$ is fed to 70 through the left hand contact of relay 67 in position of rest) and the sliding element of potentiometer $P_3$. Consequently terminals 63a and 63b respectively receive F and the portion of the voltage of source 72 collected by the sliding element of potentiometer $P_3$. Amplifier 64 and motor 62 displace the sliding elements of $P_3$ and $P_4$ until the sliding element of $P_3$ collects F which is thus stored in $P_3$. Due to the fact that the sliding element of $P_4$ is mechanically coupled with that of $P_3$ and that it receives voltage P from the cathode of triode 77, the current in potentiometer $P_4$ is proportional to P and inversely proportional to F, and therefore represents $P/F$. This factor $P/F$ is indicated on the dial of 83 and is available between conductors $84a$, $84b$. The energizing of relay 69 has also for its effect to branch terminals $85a$, $85b$ on $84a$, $84b$, thereby permitting to record $P/F$ on the recorder which also records $F_0$ and E. A lamp 73 is switched on by a step wave $Wa$ arriving through WY during the whole cycle of area $y$.

Thus, we therefore determine, with the device of FIGS. 5 and 6 (the drum being of the type illustrated by FIG. 2) the different factors useful for montoring the activity of a gaseous stream, to wit:

The activity F of the short-lived ions that are collected, which indicates the importance of a possible break or crack of a fuel jacket, The ratio $P/F$ of the respective activities of the long-lived ions and of the short-lived ions that are collected which indicates the importance of the gaseous diffusion through a jacket or of the microcracks that may occur in said jacket, The activity of the cooling gas which gives an indication concerning the neutron flux, The evolution E of activity F when taking into account variations of specific activity.

Sweeping with clean $CO_2$ through conduit 3 during all the cycles (with the exception of that corresponding to area $x$) considerably reduces the parasitic influence of the active gases on the measurements.

The details of construction given with reference to FIGS. 5, 6 and 7 also apply to the first described embodiment in which it merely suffices not to determine $a$ by an electronic chain associated with detector 12–13 (by area $x$), this determination being effected by means of detector 25, 26 and its electronic chain.

Supplementary details concerning gase-cooled heterogeneous nuclear reactors, detection of breaks in the fuel jackets in such reactors by collecting ions resulting from fission products having escaped from the punctured jackets, scintillation detectors and the electronic system associated therewith, monitoring devices making use of rotary drums, analog calculation units of the potentiometer type or of the type illustrated at 52, 55 and 78 and experimental loops are given in the above mentioned patents filed by the Commissariat à l'Energie Atomique.

In a general manner, while we have, in the above description, disclosed what we deem to practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A device for determining the concentration of the short-lived and long-lived fission products in a gaseous stream and the total radioactivity thereof, which comprises, in combination, a chamber, a rotating metallic drum, a positive ion repulsion electrode disposed opposite the periphery of said drum, a radioactivity detector disposed opposite the periphery of said drum at some distance from said electrode, a gas-tight casing surrounding said drum, said detector and said electrode, means for circulating said gaseous stream successively through said chamber for allowing the short-lived fission products in said stream to decay substantially in said chamber into positive radioactive ions and through the space between said drum and said electrode, the peripheral portion of said drum being provided with a recessed area capable of imprisoning, between itself and the inner wall of said casing, a given volume of said gaseous stream arriving from said chamber to bring it into proximty to said detector, the periphery of said drum comprising a plurality of areas, said areas, with the exception of said recessed area and of at least one special non-recessed area, being called normal areas, means for bringing successively in a given cyclic order, all these normal areas first opposite said detector for measuring the radioactivity before ion collection, then opposite said repulsion electrode at a positive potential for ion collection on said drum and finally again opposite said detector for measuring the radioactivity after ion collection, and for periodically bringing said recessed area and said special non-recessed area opposite said detector for measuring the radioactivity, and calculator means operatively connected with said detector for giving, in response to the measurements made by said detector for the respective areas of said drums, the concentration of the short-lived fission products in said gaseous stream, the concentration of the long-lived fission products in said gaseous stream and the total activity of said gaseous stream, said calculator means comprising first means for calculating the concentration of short-lived fission products in said gaseous stream by deducting the radioactivity measured by said detector on a normal area, after ion collection from the radioactivity measured by said detector on the same normal area before ion collection, secondly means for calculating the concentration of long-lived fission products in said gaseous stream by deducting the radioactivity measured by said detector, before ion collection, on the normal area located immediately before said special non-recessed area in said given cyclic order from the radioactivity measured by said detector on said special non-recessed area, and thirdly means for calculating the total radioactivity of said gaseous stream from the radioactivity measured by said detector on said recessed area.

2. A device according to claim 1 further comprising means for injecting a stream of non-active gas between the drum periphery and said detector.

3. A device according to claim 1 wherein the number of areas of the drum ranges from 15 to 20.

4. A device according to claim 1 wherein the duration of the measurement cycle for a normal area is approximately two minutes, comprising from twenty to twenty-five seconds for each of the radioactivity measurements by the detector about one minute for ion collection and the remainder of the two minutes for shifting from one position to another.

5. A device according to claim 1 wherein the distance between said electrode and said detector along the periphery of the drum is equal to the total width of a number of areas having no common factor with the total number of areas.

6. A device according to claim 1 further comprising a second detector connected with said chamber for measuring the activity of the gas therein, thereby selectively determining the radioactivity of the nitrogen gas contained in said chamber.

7. A device according to claim 1 which comprises means operative by said detector for determining, from the radioactivity measurements made by said detector on the recessed area and concerning the volume of gas imprisoned between this area and the casing of the drum, a correction factor representing the neutron flux of the gaseous stream.

8. A device according to claim 7 including an electronic channel for said detector, said channel comprising two amplitude discrimination thresholds and two sensitivity thresholds, one of the pairs of theresholds serving for the measurement of the ion radioactivity and the other pair of thresholds of the measurement of the radioactivity of nitrogen 16 imprisoned in the recessed area.

9. A device according to claim 1 comprising, for every type of area having a particular program, a relay including a holding contact and capable of memorizing the program corresponding to every type of area, means for energizing this last mentioned relay at the beginning of every elementary cycle for an area and means for placing said holding contact out of action after the program of an elementary cycle has been performed.

10. A device according to claim 9 further comprising selecting contacts arranged to be controlled by said memorizing relays, some of said selecting contacts being adapted to control the rotation of said drum in one direction or the other, and others of said selecting contacts being capable of controlling analog calculation units for performing linear operations and storing-up operations on the values measured by said detector.

11. A device according to claim 10 further comprising a series of potentiometers having each a sliding element, analogic comparison means for driving said sliding elements respectively to compare the voltage of a sliding element to a voltage to be stored up so as to bring said sliding element in a position representative of the voltage to be stored up.

References Cited in the file of this patent
UNITED STATES PATENTS

| | | |
|---|---|---|
| 2,576,616 | Livingston et al. | Nov. 27, 1951 |
| 2,599,922 | Kanne | June 10, 1952 |
| 2,751,505 | Anderson | June 19, 1956 |
| 2,826,076 | Boritz et al. | Mar. 11, 1958 |
| 2,946,891 | Weslolowski | July 26, 1960 |
| 2,953,687 | Bergstedt | Sept. 20, 1960 |
| 2,957,084 | Marr et al. | Oct. 18, 1960 |
| 3,009,098 | Simons | Nov. 14, 1961 |
| 3,027,458 | Fowler et al. | Mar. 27, 1962 |
| 3,038,078 | Kern | June 5, 1962 |
| 3,084,252 | Goupil et al. | Apr. 2, 1963 |
| 3,084,254 | Goupil et al. | Apr. 2, 1963 |